(12) United States Patent
Wada et al.

(10) Patent No.: US 10,576,638 B2
(45) Date of Patent: Mar. 3, 2020

(54) TEACHING DEVICE

(71) Applicants: United Seven Corporation, Osaka-shi, Osaka (JP); Seedsware Corporation, Izumi-shi, Osaka (JP)

(72) Inventors: Susumu Wada, Osaka (JP); Hiroyuki Tsuji, Osaka (JP); Mitsugi Yoshii, Osaka (JP)

(73) Assignees: UNITED SEVEN CORPORATION, Osaka (JP); SEEDSWARE CORPORATION, Osaka (JP)

( * ) Notice: Subject to any disclaimer, the term of this patent is extended or adjusted under 35 U.S.C. 154(b) by 0 days.

(21) Appl. No.: 16/095,489

(22) PCT Filed: May 16, 2017

(86) PCT No.: PCT/JP2017/018298
§ 371 (c)(1),
(2) Date: Oct. 22, 2018

(87) PCT Pub. No.: WO2017/208800
PCT Pub. Date: Dec. 7, 2017

(65) Prior Publication Data
US 2019/0126489 A1 May 2, 2019

(30) Foreign Application Priority Data
May 31, 2016 (JP) .................. 2016-109408

(51) Int. Cl.
*G05B 19/04* (2006.01)
*G05B 19/18* (2006.01)
(Continued)

(52) U.S. Cl.
CPC ............... *B25J 13/02* (2013.01); *B25J 9/163* (2013.01); *B25J 13/06* (2013.01); *B25J 19/06* (2013.01)

(58) Field of Classification Search
CPC ............ B60H 1/00207; B60H 1/00328; B60H 1/00378; B60H 1/32281; B60H 2001/00228; E02F 9/0858
See application file for complete search history.

(56) References Cited

U.S. PATENT DOCUMENTS 5,937,143 A   8/1999  Watanabe et al.
2004/0260426 A1 * 12/2004 Johannessen .......... B25J 9/1674
                                                            700/245

(Continued)

FOREIGN PATENT DOCUMENTS

JP   H0976182 A   3/1997
JP   H0985655 A   3/1997
(Continued)

OTHER PUBLICATIONS

International Search Report PCT/ISA/210 for International Application No. PCT/JP2017/018298 dated Jun. 27, 2017.
(Continued)

*Primary Examiner* — Harry Y Oh
(74) *Attorney, Agent, or Firm* — Harness, Dickey & Pierce, P.L.C.

(57) ABSTRACT

A teach apparatus (2) includes a tablet (3) and a safety operation device (4) which are attachable to and detachable from each other. The safety operation device (4) includes at least one of an emergency stop switch (41a), a dead-man switch (41b), and a mode switch (41c). The tablet (3) is configured to monitor the ON/OFF state of at least one of the first to third switches (41a) to (41c) of the safety operation device (4).

10 Claims, 4 Drawing Sheets

(51) Int. Cl.
  *B25J 13/02* (2006.01)
  *B25J 19/06* (2006.01)
  *B25J 13/06* (2006.01)
  *B25J 9/16* (2006.01)

(56) References Cited

U.S. PATENT DOCUMENTS

| | | | | |
|---|---|---|---|---|
| 2007/0164696 | A1* | 7/2007 | Henne | G05B 19/427 |
| | | | | 318/568.13 |
| 2008/0125908 | A1* | 5/2008 | Sjoberg | B25J 9/1674 |
| | | | | 700/247 |
| 2008/0255704 | A1* | 10/2008 | Braut | B25J 13/02 |
| | | | | 700/264 |
| 2009/0128079 | A1* | 5/2009 | Sjoberg | B25J 13/06 |
| | | | | 318/568.13 |
| 2009/0212731 | A1* | 8/2009 | Endresen | B25J 9/1674 |
| | | | | 318/568.24 |
| 2010/0106299 | A1* | 4/2010 | Nagata | B25J 13/06 |
| | | | | 700/264 |
| 2010/0145520 | A1* | 6/2010 | Gerio | B25J 13/06 |
| | | | | 700/264 |
| 2011/0010006 | A1* | 1/2011 | Tani | B25J 9/1674 |
| | | | | 700/245 |
| 2013/0151010 | A1* | 6/2013 | Kubota | B25J 13/06 |
| | | | | 700/264 |
| 2014/0067128 | A1* | 3/2014 | Kowalski | G05B 19/409 |
| | | | | 700/264 |
| 2015/0273704 | A1 | 10/2015 | Inaba et al. | |
| 2016/0031077 | A1* | 2/2016 | Inaba | B25J 9/0081 |
| | | | | 700/264 |
| 2016/0114478 | A1* | 4/2016 | Wu | B25J 13/006 |
| | | | | 700/264 |
| 2016/0379482 | A1 | 12/2016 | Saito et al. | |

FOREIGN PATENT DOCUMENTS

| | | |
|---|---|---|
| JP | 200188068 A | 4/2001 |
| JP | 2004355195 A | 12/2004 |
| JP | 2011197859 A | 10/2011 |
| JP | 2014184519 A | 10/2014 |
| JP | 201591622 A | 5/2015 |
| JP | 2015188990 A | 11/2015 |
| JP | 201660018 A | 4/2016 |
| WO | WO-2015137135 A1 | 9/2015 |

OTHER PUBLICATIONS

Notification of Reasons for Refusal for JP Application No. 2016-109408 dated Nov. 21, 2017.
Decisions to Grant a Patent for JP Application No. 2015-109408 dated Apr. 11, 2018.
International Preliminary Report on Patentability dated Dec. 6, 2018.

* cited by examiner

TEACHING DEVICE

TECHNICAL FIELD

The present invention relates to a teach apparatus for robot teaching via which teach data for controlling various robots is input.

BACKGROUND ART

A robot teaching operation apparatus that is connected to a control device for an industrial robot and that enables a user to carry out various kinds of operation in a hand-held manner has been known (Patent Literature 1).

The robot teaching operation apparatus of Patent Literature 1 is constituted by a personal digital assistant (PDA), which is a general-purpose mobile data terminal, and an emergency stop command device provided with an emergency stop switch and a dead-man switch. The PDA and the emergency stop command device are configured to be attachable to and detachable from each other by a connecter.

According to the robot teaching operation apparatus of Patent Literature 1, the PDA, when detached from the emergency stop command device, can be carried around by a user and thus has improved portability. Furthermore, by using a general-purpose product as the PDA, it is possible to reduce the production cost for the robot teaching operation apparatus itself as compared to using a dedicated device.

CITATION LIST

Patent Literature

Patent Literature 1

Japanese Patent Application Publication Tokukai No. 2004-355195 (Publication date: Dec. 16, 2004)

SUMMARY OF INVENTION

Technical Problem

However, the robot teaching operation apparatus of Patent Literature 1 is not configured such that the emergency stop command device notifies the PDA of the ON/OFF states of the emergency stop switch and the dead-man switch of the emergency stop command device. The robot teaching operation apparatus of Patent Literature 1 is merely such that the PDA is provided with an attachment detector to determine whether or not the emergency stop command device is attached to the PDA. This is because, in order to avoid cost increase concerning the PDA, it is better to use the original functions of a commercially-available PDA, and therefore it is not possible to provide an additional configuration in which the emergency stop command device notifies the PDA of the ON/OFF states of the emergency stop switch and the dead-man switch.

Therefore, according to the robot teaching operation apparatus of Patent Literature 1, the ON/OFF states of the emergency stop switch and the dead-man switch cannot be monitored via the PDA. It follows that, according to the robot teaching operation apparatus of Patent Literature 1, it is difficult for the PDA to improve the reliability and safety of robot control that is carried out according to the ON/OFF states of the emergency stop switch and the dead-man switch.

Furthermore, the robot teaching operation apparatus of Patent Literature 1 is not capable of presenting appropriate, easy-to-understand displays to a user, and is not capable of controlling command output (i.e., not capable of outputting an alert). That is, it is not possible to ensure safe operation.

The present invention was made in view of the above issues, and an object thereof is to provide a teach apparatus in which a tablet makes it possible to improve the reliability and safety of robot control that is carried out according to the ON/OFF states of an emergency stop switch, a dead-man switch, and/or a mode switch.

Solution to Problem

In order to attain the above object, a teach apparatus according to one or more embodiments of the present invention is a teach apparatus for robot teaching, configured to provide teach data for a robot to carry out an action, the teach apparatus including: a safety operation device including at least one of a first switch, a second switch, and a third switch, the first switch being configured to be used to stop a robot, the second switch being configured such that teaching to the robot is permitted only while the second switch is in an ON state, the third switch being configured to be used to place the robot into a manual mode or an automatic mode; and a tablet that is attachable to and detachable from the safety operation device, the tablet being configured to monitor an ON/OFF state of the at least one of the first switch, the second switch, and the third switch of the safety operation device.

Advantageous Effects of Invention

According to the present invention, a teach apparatus, which is constituted by a tablet and a safety operation device attachable to and detachable from each other, is configured such that the tablet monitors the ON/OFF states of an emergency stop switch, a dead-man switch, and/or a mode switch of the safety operation device. This makes it possible for the tablet to improve the reliability and safety of robot control that is carried out according to the ON/OFF states of the emergency stop switch, the dead-man switch, and/or the mode switch.

DESCRIPTION OF EMBODIMENTS

The following description will discuss embodiments of the present invention in detail. A teach apparatus in accordance with the present invention is not limited to be used in carrying out teaching to industrial robots, but may also be used to carry out teaching to a variety of other machines such as various machine tools whose motions are to be controlled. The following embodiments of the present invention exemplarily discuss configurations in which the teach apparatus is used to carry out teaching to a robot.

Figure 1:
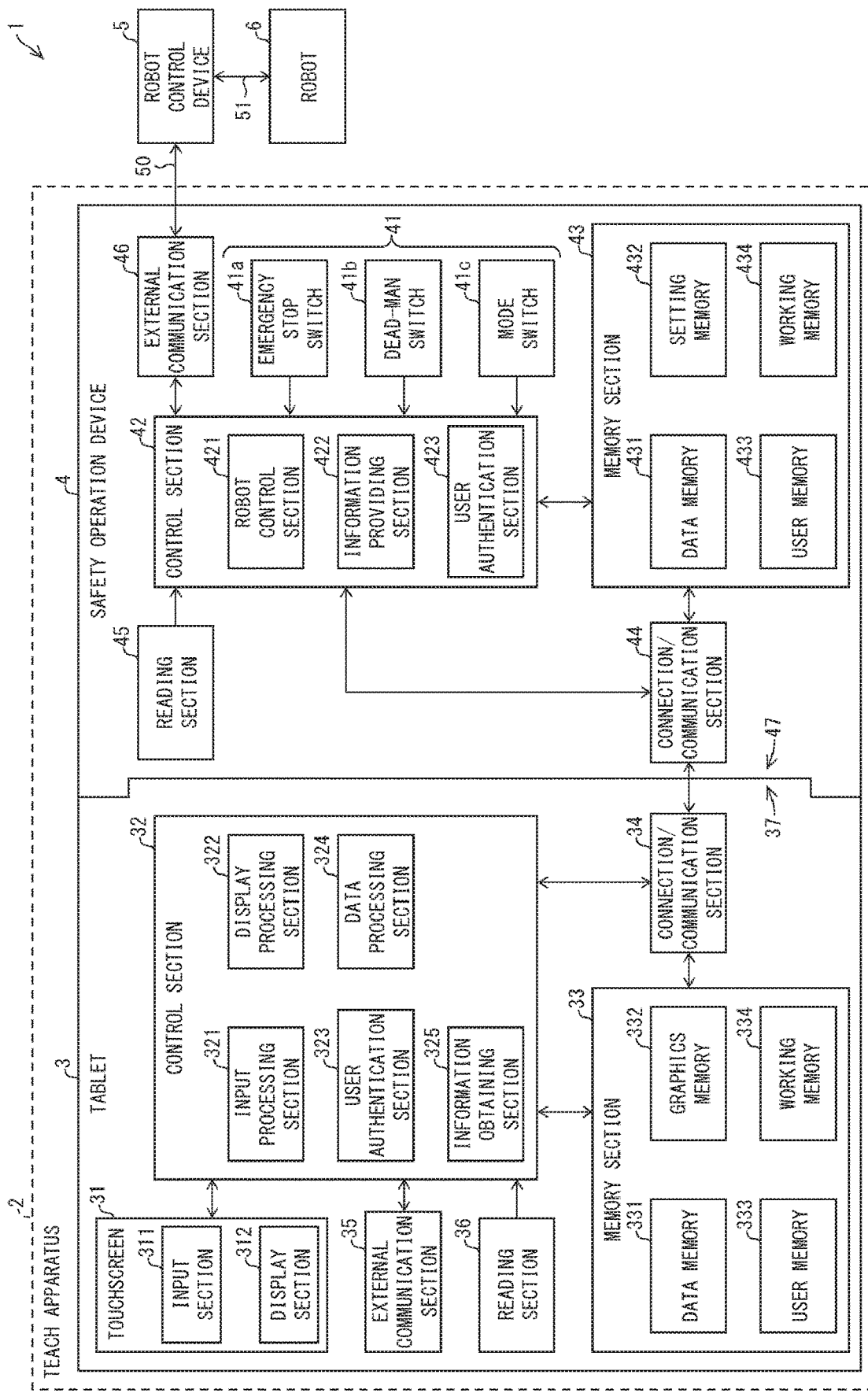
FIG. 1 is a block diagram illustrating a configuration of a control system including a teach apparatus according to one or more embodiments of the present invention.
Figure 2:
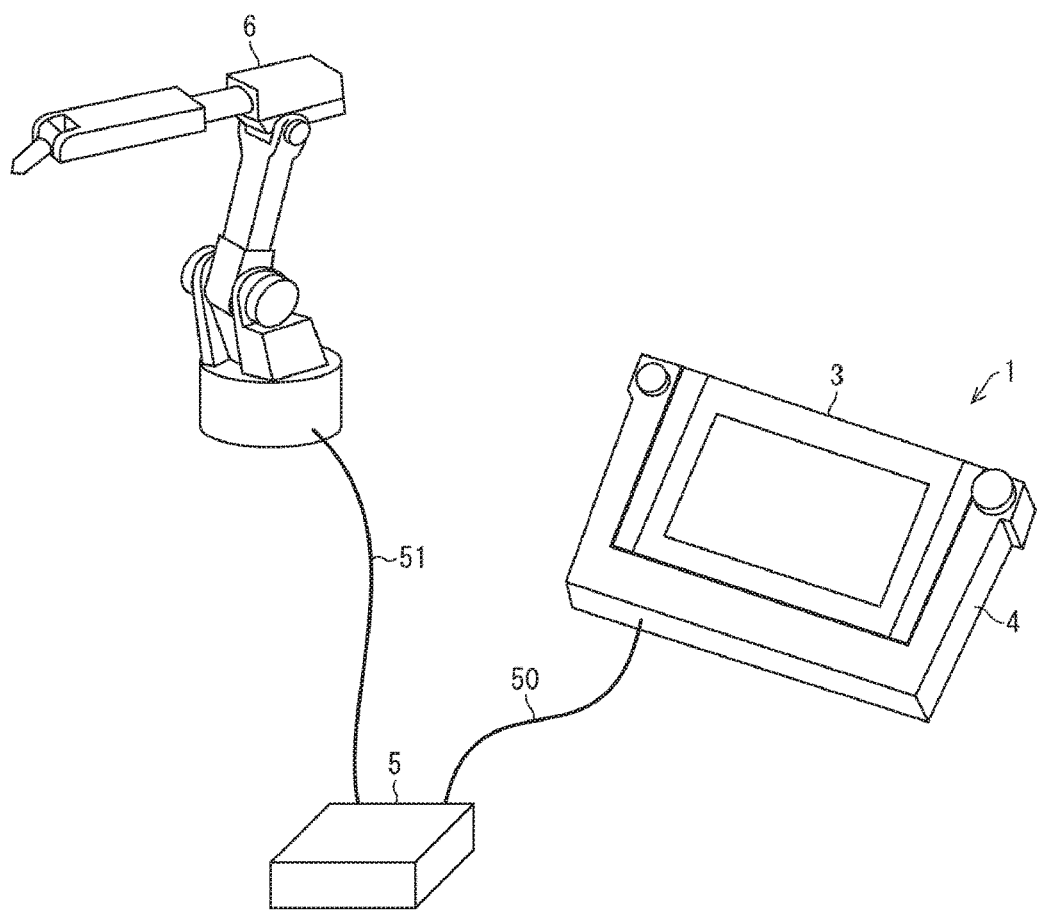
FIG. 2 illustrates how the teach apparatus, a robot control device, and a robot, which are included in the control system, are connected together.
Figure 3:
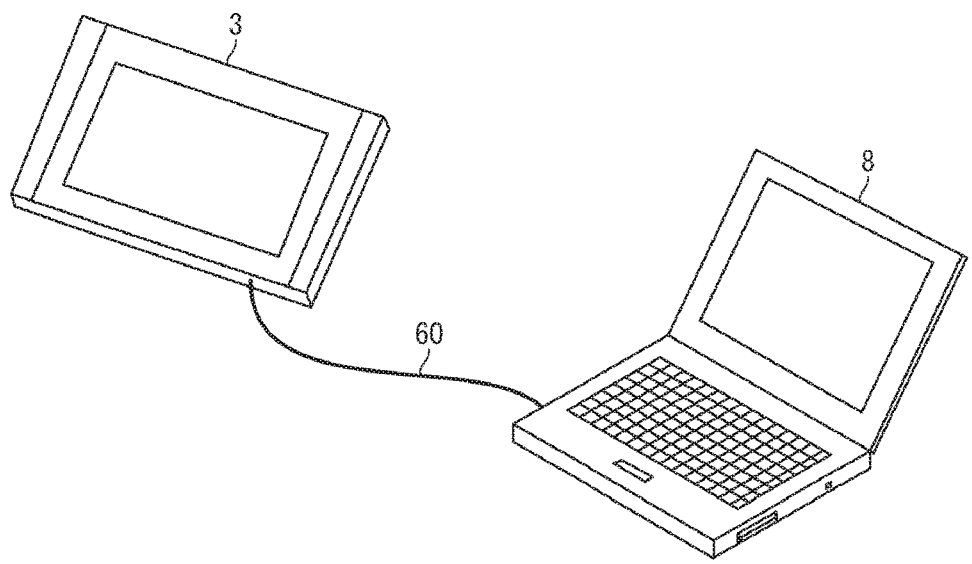
FIG. 3 illustrates how a tablet of the teach apparatus and a personal computer (PC) are connected together.
Figure 4:
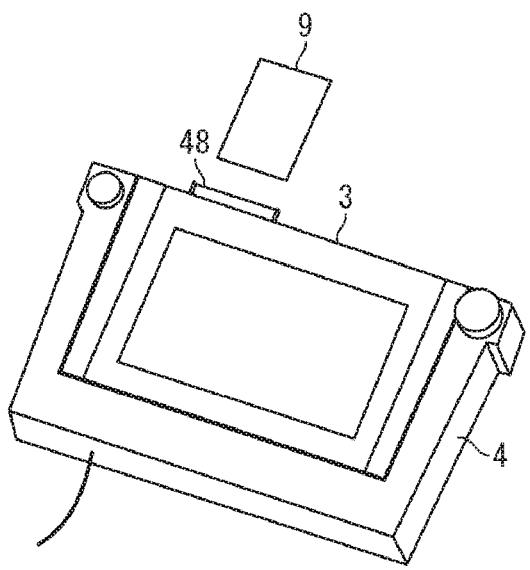
FIG. 4 illustrates how the tablet and a safety operation device, which are included in the teach apparatus, are connected together. (a) of FIG. 4 illustrates the tablet attached to the safety operation device, and (b) of FIG. 4 illustrates the tablet detached from the safety operation device 4.
Figure 4:
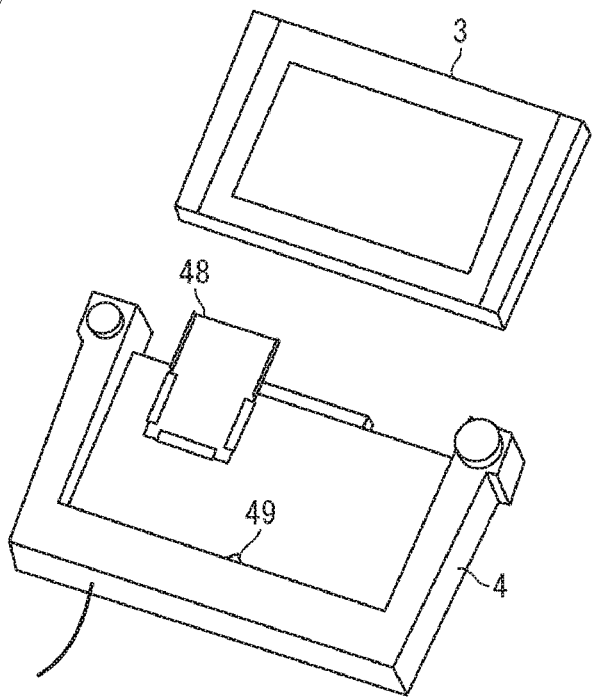

FIG. 1 is a block diagram illustrating a configuration of a control system 1 including a teach apparatus 2 according to one or more embodiments of the present invention. FIG. 2 illustrates how the teach apparatus 2, a robot control device 5, and a robot 6, which are included in the control system 1, are connected together. FIG. 3 illustrates how a tablet 3 of the teach apparatus 2 and a personal computer (PC) 8 are connected together. (a) of FIG. 4 illustrates the tablet 3 attached to the safety operation device 4, and (b) of FIG. 4 illustrates the tablet 3 detached from the safety operation device 4.

As illustrated in FIG. 1, the control system 1 includes the robot 6, the robot control device 5 configured to control actions of the robot 6, and the teach apparatus 2 that is connected to the robot control device 5 and that is configured to teach actions to the robot 6.

As illustrated in FIG. 2, the robot control device 5 and the teach apparatus 2 are connected together via a connection cable 50, whereas the robot 6 and the robot control device 5 are connected together via a connection cable 51.

Note that there are some cases in which a plurality of teach apparatuses are connected to a single robot. It should be understood that, particularly in such cases, the teach apparatus 2 of the present invention, which is separable, is advantageous in cost.

The robot 6 is connected to a dedicated computer via a wired network. Main settings of the robot 6 are made via the dedicated computer over the wired network. Therefore, main settings of the teach apparatus 2 may also be made via the robot 6. According to the separable teach apparatus 2 of the present invention, it is possible to make not only the above main settings but also advanced settings via the dedicated computer, without having to use the robot 6.

Control System 1

The teach apparatus 2 is configured to be connected to the robot control device 5 for controlling the robot 6, and is often called a teach pendant. The teach apparatus 2 is used to input various kinds of teach data such as action mode, points to be reached by the robot, how to palletize, and speed, which are for use to achieve automatic operation of the robot 6. The teach apparatus 2 also has the function of manually operating the robot 6 by an input operation via a touchscreen.

Generally, a robot control program is created on a PC or the like in a manufacturer's office or user's office, not in a factory or plant where a robot is to be installed. Then, a user installs the program on a robot control device and thereby causes the robot control device to control the robot to carry out actions.

The user sometimes makes simple modification or addition to the program at a site where the robot is installed. In this case, the user often uses a teach pendant which can be operated in a hand-held manner.

It should be noted that usually the teach pendant is used only to make minor adjustments. In many cases, main settings are made via a console on the robot machine itself. Therefore, the user loads the main settings from the robot machine into the teach pendant and makes minor adjustments through step-by-step actions.

The robot control device 5 is constituted by a computer including a CPU and a memory. The robot control device 5 achieves automatic control of the robot 6 by driving a servomotor provided for each axis of the robot 6 in accordance with an action program stored in the memory and with points taught by the teach apparatus 2. The robot control device 5, upon receipt of an instruction of manual operation from the teach apparatus 2, drives each axis of the robot 6 in accordance with the instruction.

The robot 6 is configured to serve as an articulated industrial robot.

(Teach Apparatus 2)

The teach apparatus 2 includes the tablet 3 and the safety operation device 4. The tablet 3 and the safety operation device 4 are attachable to and detachable from each other. This attachable-and-detachable configuration is achieved by connection/disconnection between a connector unit 37 of the tablet 3 and a connector unit 47 of the safety operation device 4.

The tablet 3, for its portability, can be connected to two or more different robot devices having different functions, and is also capable of, when connected to a robot, receiving an ID (which identifies, for example, kind or role that differs from one robot to another) of the robot and storing therein some setting corresponding to the kind, role, and/or the like that differs from one robot to another.

Furthermore, any desired software can be installed on the tablet 3. The tablet 3 can therefore have the following function by connecting to a PC via a universal serial bus (USB) or the like. This is a great advantage of the tablet 3 being of a separable type.

First of all, a robot manufacturer can freely design the specifications of a teach pendant itself, and can also provide a development environment. Furthermore, it appears possible for a robot user, who uses a robot in their own factory or the like, to receive an order for the specifications of the teach pendant from the robot manufacturer.

Secondly, the robot user can manage the content of teaching (program for robot's actions), modify the content of teaching, and use the content of teaching for some other purpose, via a PC or the like. Furthermore, when the robot user inputs main data or the like into the tablet in a disconnected state or into the tablet via the PC prior to teaching, the time taken for the teaching is shortened and easier teaching is achieved.

Furthermore, since a single tablet can be used to control a plurality of robots, system cost is reduced.

It should be noted that the tablet 3 can be a general-purpose tablet for general consumers but has the functions of a teach pendant. Thus, the tablet 3 can also be used as a usual tablet which is attachable to and detachable from a device for factory automation (FA), as a part of a programmable controller.

(Tablet 3)

The tablet 3 includes a touchscreen 31, a control section 32, a memory section 33, a connection/communication section 34, an external communication section 35, and a reading section 36.

The touchscreen 31 is constituted by an input section 311 and a display section 312. The input section 311 is an input device via which a user inputs instruction signals to the teach apparatus 2. The input section 311 supplies, to an input processing section 321 (described later), a signal resulting from user's touch operation on the input section 311. The display section 312 is a display device that displays information to be processed by the teach apparatus 2. The display section 312 displays information that has been processed by a display processing section 322 (described later). The display section 312 displays operation graphics for receiving an operation to control the robot 6. The display section 312 is constituted by a display device such as a liquid crystal display (LCD) or an organic EL display.

The tablet 3 is also capable of playing movies and the like, and therefore a manual of the teach apparatus 2 and the like can also be displayed on the display section 312 in an easily understandable manner.

The control section 32 includes the input processing section 321, the display processing section 322, a user authentication section 323, a data processing section 324, and an information obtaining section 325. The control section 32 may further include some other member for the tablet 3 to be used as a general tablet terminal.

The input processing section 321 processes a signal that has been caused by the user's touch operation and that has been detected by the input section 311, and supplies the processed signal to the display processing section 322.

The display processing section 322 is configured to generate graphics to be displayed on the display section 312, on the basis of information supplied from the connection/communication section 34 or from the input processing section 321. Specifically, the display processing section 322 obtains information from the connection/communication section 34 or the input processing section 321. On the basis of the obtained information, the display processing section 322 obtains teach program data stored in a data memory 331 of the memory section 33 (described later), graphics data stored in a graphics memory 332 of the memory section 33 (described later), and/or data indicative of the state of the robot 6 supplied from the connection/communication section 34. Then, the display processing section 322 generates graphics to be displayed on the display section 312, and causes the display section 312 to display the generated graphics. In particular, the display processing section 322 obtains teach program data stored in the data memory 331 and graphics data stored in the graphics memory 332, and generates the foregoing operation graphics.

The user authentication section 323 is configured to restrict the use of the function of each section of the tablet 3. The user authentication section 323 also serves to identify a user on the basis of information input by the user. The user authentication section 323, upon receipt of information input by a user to the tablet 3 for authentication, searches for information that matches the received information within a user memory 333 of the memory section 33 (described later). If the user authentication section 323 has succeeded in finding information that matches the received information, then the user authentication section 323 eliminates a restriction(s) on the use of a function(s) of a section(s) of the tablet 3. On the other hand, if the user authentication section 323 has failed to find any information that matches the received information, then the user authentication section 323 maintains the restriction on the use of the function of each section of the tablet 3. Assume that the tablet 3 and the safety operation device 4 are connected to each other, i.e., the tablet 3 and the safety operation device 4 function as the teach apparatus 2. In this case, if the user authentication section 323 has succeeded in finding information that matches the received information, the user authentication section 323 eliminates a restriction(s) on the use of a function(s) of a section(s) of the tablet 3 and/or the safety operation device 4 to place the teach apparatus 2 into a usable state. It should be noted that the restriction on the use of the function of each section of the tablet 3 and/or the safety operation device 4 is not limited to a specific kind of restriction, and may be selected appropriately according to, for example, the conditions in which the teach apparatus 2 is used. How the user inputs information for authentication is not particularly limited, as well. For example, the input of information for user authentication may be input of a password via the touchscreen 31 or may be reading of an ID via the reading section 36.

The data processing section 324 processes a signal that has resulted from the user's touch operation and that has been detected by the input section 311, and generates teach data to be transmitted to the robot control device 5. The data processing section 324 also supplies the generated teach data to the connection/communication section 34.

The information obtaining section 325 obtains switch information indicative of the ON/OFF state of each of the switches in a switch group 41 of the safety operation device 4. The information obtaining section 325 also obtains robot information concerning the robot 6, such as the ID, status, and the like of the robot 6. The information obtaining section 325 supplies the obtained switch information and robot information to each of the sections (such as the input processing section 321 and the display processing section 322) in the control section 32.

Assume that the tablet 3 is connected to the safety operation device 4. In this case, it is most notable here that the tablet 3, which obtains the foregoing switch information through the information obtaining section 325, is capable of monitoring the ON/OFF state of each of the switches included in the switch group 41 of the safety operation device 4. In the present embodiment, the switch group 41 includes at least one of: an emergency stop switch (emergency stop SW) 41a; a dead-man switch (dead-man SW) 41b; and a mode switch (mode SW) 41c (described later). The tablet 3 monitors the ON/OFF state of each of the three switches, and thereby improves the reliability and safety of robot control that is carried out according to the ON/OFF states of the emergency stop switch 41a (first switch), dead-man switch 41b (second switch), and/or mode switch 41c (third switch). Monitoring the states of the emergency stop switch 41a, dead-man switch 41b, and mode switch 41c via the tablet 3 is advantageous in that, for example, these states are easy-to-understand to a user, misoperation can be prevented, safety is achieved, and an alert can be output quickly.

When the tablet 3 is attached to (combined with) the safety operation device 4 and satisfies the following condition X as with a usual teach pendant, a user is enabled, depending on the authority of the user, to carry out teach operation by entering commands via the tablet 3.

Condition X: Mode switch 41c is in manual mode, and dead-man switch is in ON state The memory section 33 includes the data memory 331, the graphics memory 332, the user memory 333, and a working memory 334, which are non-transitory or transitory memories for storing various data. The memory section 33 may further store various data for the tablet 3 to be used as a general tablet terminal.

The data memory 331 is constituted by a static random access memory (SRAM) and/or a dynamic random access memory (DRAM), and stores various data generated outside or inside the teach apparatus 2. Such various data also include the foregoing teach program data. The data memory 331 thus stores various kinds of data, and therefore does not have to be constituted by a single memory. The data memory 331 is preferably constituted by different kinds of memory corresponding to the kinds of data, or may have different storage areas corresponding to the kinds of data if the data memory 331 is constituted by a single memory.

The graphics memory 332 is a memory that stores graphics files and the like. A flash erasable programmable read-only memory (FEPROM) is used as the graphics memory 332. A graphics file is a file that contains data of one or more graphics items (unit graphics constituted by graphics data for one frame) to be displayed on the teach apparatus 2.

The user memory 333 is a memory that stores information used to uniquely identify a user of the teach apparatus 2. The working memory 334 is used for working when arithmetic processing such as display processing is carried out. The working memory 334 is also capable of storing states of the robot 6 and teach data provided to the robot 6.

The connection/communication section 34 exchanges various data with a connection/communication section 44 of the safety operation device 4 (described later). The connection/communication section 34 is configured to supply received data to the control section 32 and to store the received data in the memory section 33.

The connection/communication section 34 also checks whether or not the tablet 3 is in connection with the safety operation device 4. The connection/communication section 34 checks whether the tablet 3 is in connection with the safety operation device 4 for example through use of the ID of a USB in the safety operation device 4 or use of one or more dedicated pins for checking which are provided to the connector unit 37 of the tablet 3 and/or the connector unit 47 of the safety operation device 4. For example, in (b) of FIG. 4, the connector unit 47 of the safety operation device 4 is provided with a pin 49.

Specifically, when the tablet 3 is attached to some other device other than the safety operation device 4, the dedicated pin is in an NC state. Two dedicated pins for checking may be located at opposite ends of the connector unit 37 or of the connector unit 47.

Note, however, that the above way of checking through use of a dedicated pin(s) is merely an example. The checking may be carried out on the basis of the presence/absence of near field communication (NFC) between the tablet 3 and the safety operation device 4, or may be carried out on the basis of the ON/OFF state of a mechanical switch on the tablet 3 or the safety operation device 4. That is, it is only necessary that a mechanism that is capable of detecting the connection between the tablet 3 and the safety operation device 4 (such a mechanism is connection detection mechanism), such as the foregoing pin, be provided to the connector unit 37 or the connector unit 47.

Furthermore, when the tablet 3 is attached to the safety operation device 4, the tablet 3 can be supplied with (if the tablet 3 includes a secondary battery, the secondary battery can also be charged with) electricity externally supplied via the safety operation device 4. The electricity can be supplied from, for example, the robot control device 5, a power board, or the like. It is only necessary that, for a supply voltage of 5 V required for an electronic circuit (such as USB) to be obtained, a DC-DC converter for conversion from external power (usually, 24 V) be contained in the safety operation device 4 so that the DC-DC converter is usable both for the tablet 3 and the safety operation device 4.

The external communication section 35 exchanges various data with a computer such as a PC or a workstation. The external communication section 35 is provided with an interface such as an USB or an interface for wireless communication or wired communication.

The tablet 3 uses the external communication section 35 to be linked to a computer such as a PC or a workstation located outside the teach apparatus 2. The tablet 3 is capable of carrying out bidirectional information exchange with the computer via suitable applications on the computer. The tablet 3 obtains some configuration information (e.g., authorities of two or more users) from the computer, and gives the result of robot teaching and/or the status of the robot to the computer.

Furthermore, the tablet 3 (especially when attached to the safety operation device 4), upon receiving a request or the like from an external PC or the like, transmits the state of the robot 6 and/or the content of robot teaching to the external PC or the like through use of the external communication section 35. Note, however, that the tablet 3, when attached to the safety operation device 4, does not receive teaching instructions from other PCs.

The tablet 3 may be configured such that, when the tablet 3 is attached to the safety operation device 4, robot information is transmitted to another computer through the external communication section 35 and the foregoing monitoring is carried out via the another computer.

Furthermore, the tablet 3, when not attached to the safety operation device 4, is capable of exchanging various kinds of information with an external PC or the like as with a usual tablet, and also capable of making settings for operation of the robot 6.

Furthermore, the tablet 3 is capable of bidirectional information exchange between the tablet 3 and a computer for development purposes serving as a development environment for development of the teach apparatus 2. The tablet 3 uses the external communication section 35 to be linked to the computer for development purposes. The tablet 3 downloads, from the computer for development purposes, a program that determines a function of the teach apparatus 2, for example. By downloading programs from the computer for development purposes, it is possible to achieve a teach apparatus 2 that has functions corresponding to respective two or more robots 6. The computer for development purposes has installed therein dedicated software that provides a development environment, via which a function of the teach apparatus 2 can be selected and the content of teach data to be provided to the robot 6 can be selected.

Furthermore, initial settings for teaching by the teach apparatus 2, and also the ID information of each user and operations permitted for the user, can be downloaded from the computer for development purposes to the teach apparatus 2, for example.

As has been described, the tablet 3, which is separable, offers great flexibility in establishing a system.

The reading section 36 carries out reading of a user ID (user information). For example, the following configuration may be employed: when the tablet 3 and the safety operation device 4 are connected together, a card with an interface such as NFC or Bluetooth (registered trademark) can be attached to (easily attachable to and detachable from) the tablet 3 or the safety operation device 4. For example, the following configuration, such as that illustrated in FIG. 4, may be employed: the safety operation device 4 includes a card receiving holder 48 so that a card 9 can be inserted into the card receiving holder 48.

A configuration in which different user IDs are stored in respective cards and in which the level and authority for operation differ from one user to another may be employed. Use of such a card, which stores a user ID therein, makes it possible to reduce the likelihood that the user ID would be revealed to a third person (e.g., coworker). This is because the use of the card eliminates the need for displaying the entered user ID on a screen or the like, and thereby the user ID is prevented from being seen by a third person.

This makes it possible, for example, to maintain logs of who carried out the operation, and to restrict the use of some operation depending on the user ID.

Possible operator categories for users are, for example: (1) an operator not permitted to operate the apparatus at all: (2) an operator only permitted to carry out teaching; (3) an operator permitted to carry out operation even under fault conditions and to carry out maintenance of the apparatus, who is, if the I/O of the robot is broken, provided with information about the broken part and test-operates only the broken part to carry out checking or the like; and (4) an operator permitted to obtain, via a teach pendant, information such as the rate of operation of the robot and yield.

It is also possible to restrict the use of different functions and/or operations depending on the user's level or role, depending on the user ID.

(Safety Operation Device 4)

The safety operation device 4 includes the switch group 41, a control section 42, a memory section 43, the connection/communication section 44, a reading section 45, and an external communication section 46. The safety operation device 4 preferably further includes a holding mechanism (not illustrated) for holding the tablet 3.

The switch group 41 includes at least one of the following: the emergency stop switch (emergency stop SW) 41*a*; the dead-man switch (dead-man SW) 41*b*; and the mode switch (mode SW) 41*c*.

The emergency stop switch 41*a* is provided so that the robot 6 can be immediately stopped any time by use of the emergency stop switch 41*a*. The emergency stop switch 41*a* is in an enable state regardless of whether the foregoing card is attached or not and regardless of what is stored in the card.

The dead-man switch 41*b* is a switch configured such that teaching to the robot 6 is permitted only while it is in an ON state. In case the robot 6 has carried out some unexpected action, the robot can be stopped immediately by turning OFF the dead-man switch 41*b*.

The mode switch 41*c* serves to select the operation mode of the robot 6 from a manual mode and an automatic mode. In the manual mode, the robot 6 can be operated directly via the teach apparatus 2, and thereby points can be taught to the robot 6. In the automatic mode, it is possible to cause the robot 6 to carry out actions in accordance with an action program stored in advance.

The control section 42 includes a robot control section 421, an information providing section 422, and a user authentication section 423.

The robot control section 421 controls the robot 6 by communicating with the robot control device 5 in accordance with the ON/OFF states of the emergency stop switch 41*a*, dead-man switch 41*b*, and mode switch 41*c* included in the switch group 41.

It is notable here that the robot control section 421 is capable of causing the robot 6 to automatically run when the operation mode of the robot 6 is brought into the automatic mode by the mode switch 41*c*, provided that the emergency stop switch is in an OFF state.

The information providing section 422 supplies, to the tablet 3, switch information indicative of the ON/OFF states of the switches included in the switch group 41. The information providing section 422 also supplies, to the tablet 3, robot information concerning the robot 6 such as the ID and status of the robot 6.

This makes it possible for the tablet 3 to keep receiving robot information and thereby recognize the ID of the robot 6 and, according to the functions of the robot 6, display and execute commands and the like. It is also possible for the tablet 3 to display the status and the like of the robot 6.

The user authentication section 423 is configured to restrict the use of the function of each section of the safety operation device 4. The user authentication section 423 also serves to identify a user on the basis of information input by the user. Specifically, the user authentication section 423, upon receipt of information input to the safety operation device 4 by a user for authentication, searches for information that matches the received information within a user memory 433 of the memory section (described later). If the user authentication section 423 has succeeded in finding information that matches the received information, then the user authentication section 423 eliminates a restriction(s) on the use of a function(s) of a section(s) of the safety operation device 4. On the other hand, if the user authentication section 423 has failed to find any information that matches the received information, then the user authentication section 423 maintains the restriction on the use of the function of each section of the safety operation device 4. It should be noted that the restriction on the use of the function of each section of the safety operation device 4 is not limited to a specific kind of restriction, and may be selected appropriately according to, for example, the conditions in which the teach apparatus 2 is used. How the user inputs information for authentication is not particularly limited, as well.

The memory section 43 includes a data memory 431, a setting memory 432, the user memory 433, and a working memory 434.

The data memory 431 is constituted by an SRAM and/or a DRAM, and stores various data generated outside or inside the teach apparatus 2. The data memory 431 thus stores various kinds of data, and therefore does not have to be constituted by a single memory. The data memory 431 is preferably constituted by different kinds of memory corresponding to the kinds of data, or may have different storage areas corresponding to the kinds of data if the data memory 431 is constituted by a single memory. Examples of the data include the foregoing switch information and robot information.

The setting memory 432 stores therein information (ID) for uniquely identifying the safety operation device 4 or a robot 6.

The user memory 433 is a memory that stores information used to uniquely identify a user of the safety operation device 4. The working memory 434 is used to temporarily store data exchanged between the safety operation device 4 and the robot control device 5.

The above-mentioned data to be stored in memories such as the foregoing memory section 33 and memory section 43 are non-limited examples. For example, the memory section 33 of the tablet 3 may include a setting memory, and the memory section 43 of the safety operation device 4 may include a graphics memory.

As with the connection/communication section 34, the connection/communication section 44 exchanges various data with the connection/communication section 34 of the tablet 3. The connection/communication section 44 is configured to supply the received data to the control section 42 and to store the received data in the memory section 43.

As with the connection/communication section 34, the connection/communication section 44 also checks whether or not the tablet 3 is in connection with the safety operation device 4. To this end, the connection/communication section 44 carries out this checking through use of the ID of a USB in the safety operation device 4, or use of one or more dedicated pins for checking which are provided to the connector unit 37 of the tablet 3 and/or the connector unit 47 of the safety operation device 4.

Specifically, when the tablet 3 is attached to some other device other than the safety operation device 4, the dedicated pin is in the NC state. Two dedicated pins for checking may be located at opposite ends of the connector unit 37 or of the connector unit 47.

This makes it possible for the safety operation device 4, when the tablet 3 is detached while teaching to the robot 6 is being carried out, to send a command to the robot control device 5 to immediately stop the robot 6.

The reading section 45 carries out reading of a user ID.

The external communication section 46 exchanges various data with the robot control device 5.

FIG. 3 illustrates how the tablet 3 and a PC 8 are connected together. As illustrated in FIG. 3, since the tablet 3 is detachable from the safety operation device 4 and has portability, the tablet 3 can be connected to the PC 8 via a cable (e.g., a USB cable or an Ethernet (registered trademark) cable). This makes it possible to, for example, configure the tablet 3 so that the tablet 3 serves as any of various kinds of tablet, and manage the results of teaching, by using software installed on the PC 8.

The control section 32 of the tablet 3 and the control section 42 of the safety operation device 4 can each be realized by a logic circuit (hardware) provided in an integrated circuit (IC chip) or the like or can each be alternatively realized by software as executed by a central processing unit (CPU).

In the latter case, the control section 32 of the tablet 3 and the control section 42 of the safety operation device 4 each include a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be made available to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

Figure 5:
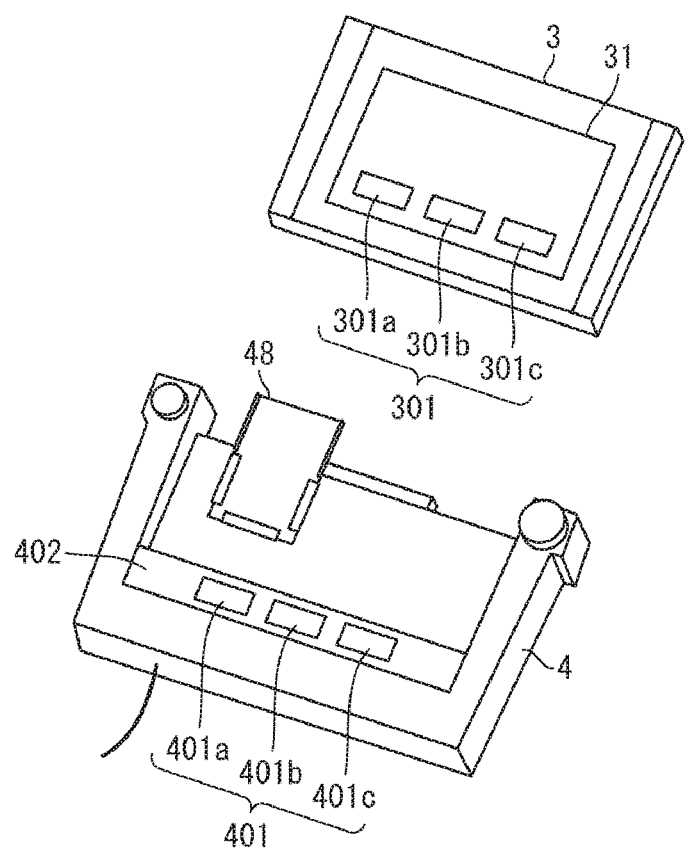
FIG. 5 illustrates alternative configurations of the tablet and the safety operation device which are included in the teach apparatus.

For example, as illustrated in FIG. 5, the safety operation device 4 may include a mechanical switch group 401 constituted by, for example, membrane switches. The switch group 401 includes a switch 401a (mechanical switch), a switch 401b (mechanical switch), and a switch 401c (mechanical switch), which are to be actuated physically. These switches provide tactile feedback during actuation because of their materials, rigidity, and the like. This makes it possible to make a user feel like surely and actually pressing the switches during actuation.

The switch group 401 is disposed on a switch panel 402. The ON/OFF states of the switch 401a, switch 401b, and switch 401c are monitored by the tablet 3, as with the foregoing switches such as the emergency stop switch 41a. The definitions (function, display) of the switches such as the switch 401a are carried out via the tablet 3. The switches such as the switch 401a may be configured such that they are in a desensitized state while the tablet 3 is not attached to the safety operation device 4. The allocation of functions to the switches such as the switch 401a may be carried out by downloading software from the foregoing computer for development purposes to the tablet 3.

As illustrated in FIG. 5, a graphics group 301 (graphics item 301a, graphics item 301b, and graphics item 301c), which indicates the names, functions, and/or the like of the respective switches such as the switch 401a, may be displayed at the lower portion of the touchscreen of the tablet 3. In FIG. 5, the graphics item 301a corresponds to the switch 401a, the graphics item 301b corresponds to the switch 401b, and the graphics item 301c corresponds to the switch 401c. When the graphics such as the graphics item 301a are displayed on the tablet 3, a user can visually recognize the names, functions, and/or the like of the switches such as the switch 401a. This improves convenience for users.

[Note]

A teach apparatus according to one or more embodiments of the present invention is a teach apparatus for robot teaching, configured to provide teach data for a robot to carry out an action, the teach apparatus including: a safety operation device including at least one of a first switch, a second switch, and a third switch, the first switch being configured to be used to stop a robot, the second switch being configured such that teaching to the robot is permitted only while the second switch is in an ON state, the third switch being configured to be used to place the robot into a manual mode or an automatic mode; and a tablet that is attachable to and detachable from the safety operation device, the tablet being configured to monitor an ON/OFF state of the at least one of the first switch, the second switch, and the third switch of the safety operation device.

As used herein, the "first switch", "second switch", and "third switch" refer to an emergency stop switch, a dead-man switch, and a mode switch, respectively.

According to the above configuration in which the monitoring is carried out by the tablet, it is possible, by the tablet, to improve the reliability and safety of robot control that is carried out according to the ON/OFF states of the emergency stop switch, dead-man switch and mode switch.

The teach apparatus is preferably configured such that the tablet is configured to control the robot according to the ON/OFF state of the at least one of the first switch, the second switch, and the third switch of the safety operation device.

The teach apparatus is preferably configured such that: the tablet and the safety operation device are attachable to each other by connection between a connector unit of the tablet and a connector unit of the safety operation device and are detachable from each other by disconnection between the connector unit of the tablet and the connector unit of the safety operation device; and the connector unit of the tablet or the connector unit of the safety operation device includes a connection detection mechanism, and the tablet or the safety operation device is configured to determine, through use of the connection detection mechanism, whether the tablet is in connection with the safety operation device.

The teach apparatus is preferably configured such that: the tablet is configured to be supplied with electricity from the safety operation device; and the tablet includes a secondary battery, the secondary battery being configured to be charged with the electricity supplied from the safety operation device.

The teach apparatus preferably includes a memory section configured to store therein user information that uniquely identifies a user, and preferably configured to, if external input user information matches the user information stored in the memory section, restrict or grant use of a function of the tablet or a function of the safety operation device according to a level of the user corresponding to the user information.

The teach apparatus is preferably configured such that: the external input user information is stored in a card; and the external input user information is input from the card to the tablet or the safety operation device.

The teach apparatus is preferably configured such that the external input user information stored in the card is input to the tablet or the safety operation device via near field communication or Bluetooth (registered trademark).

The teach apparatus is preferably configured such that the first switch is always in an enable state regardless of whether or not the card is attached and what is stored in the card.

The teach apparatus is preferably configured such that the tablet is configured to be capable of externally transmitting at least one of a state of the robot, a state of the teach apparatus, and teach data to be provided to the robot.

The teach apparatus is preferably configured such that: the safety operation device includes at least one mechanical switch; and the at least one mechanical switch is configured to be assigned a function via the tablet.

The teach apparatus is preferably configured such that the tablet is capable of bidirectional information exchange with a computer that serves as a development environment for development of the teach apparatus.

REFERENCE SIGNS LIST

1 Control system
2 Teach apparatus
3 Tablet
4 Safety operation device
5 Robot control device
6 Robot
8 PC
31 Touchscreen
32, 42 Control section
33, 43 Memory section
34, 44 Connection/communication section
35, 46 External Communication section
36, 45 Reading section
41 Switch group
41a Emergency stop switch (First switch)
41b Dead-man switch (Second switch)
41c Mode switch (Third switch)
48 Card receiving holder
49 Pin
50, 51 Connection cable
311 Input section
312 Display section
321 Input processing section
322 Display processing section
323, 423 User authentication section
324 Data processing section
325 Information acquisition section
331, 431 Data memory
332 Graphics memory
333, 433 User memory
334, 434 Working memory
401a, 401b, 401c Switch (Mechanical switch)
421 Robot control section
422 Information providing section
432 Setting memory

The invention claimed is:

1. A teach apparatus for robot teaching, configured to provide teach data for a cable-connected robot to carry out an action, the teach apparatus comprising:

a safety device including at least one first processor and at least one of a first switch, a second switch, and a third switch, the first switch being configured to stop a robot, the second switch being configured to permit teaching to the robot only while the second switch is in an ON state, the third switch being configured to place the robot into a manual mode or an automatic mode, the safety device being connected to the robot via a cable; and a tablet, including at least one second processor, configured to attach to and detach from the safety device, and configured to control the robot by providing teach data to the robot via the safety device, the tablet and the safety device being configured to attach by connection between a connector of the tablet and a connector of the safety operation device, and being configured to detach by disconnection between the connector unit of the tablet and the connector of the safety device, the at least one second processor of the tablet or the at least one first processor of the safety device being configured to determine whether the tablet is in connection with the safety device, the at least one second processor of the tablet being configured to obtain, from the at least one first processor of the safety device, switch information indicative of an ON/OFF state of the at least one of the first switch, the second switch, and the third switch of the safety device, the tablet including the at least one second processor, being configured to, upon detection of connection between the tablet and the safety operation device, obtain the switch information via the at least one first processor to thereby monitor the ON/OFF state of the at least one of the first switch, the second switch, and the third switch of the safety device, thereby controlling the robot according to the ON/OFF state of the at least one of the first switch, the second switch, and the third switch of the safety device.

2. The teach apparatus according to claim 1, wherein:
the tablet is configured to be supplied with electricity from the safety device; and
the tablet includes a secondary battery, the secondary battery being configured to be charged with the electricity supplied from the safety device.

3. The teach apparatus according to claim 1, further comprising at least one memory configured to store user information uniquely identifying a user,
wherein the teach apparatus is configured to, upon external input user information matching the user information stored in the at least one memory, restrict or grant use of a function of the tablet or a function of the safety device according to a level of the user corresponding to the user information.

4. The teach apparatus according to claim 3, wherein: the external input user information is stored in a card; and the external input user information is input from the card to the tablet or the safety device.

5. The teach apparatus according to claim 4, wherein the external input user information stored in the card is input to the tablet or the safety device via near field communication or Bluetooth (registered trademark).

6. The teach apparatus according to claim 4, wherein the first switch is always in an enable state regardless of whether or not the card is attached and regardless of content stored in the card.

7. The teach apparatus according to claim 1, wherein the tablet is configured to externally transmit at least one of a state of the robot, a state of the teach apparatus, and teach data to be provided to the robot.

8. The teach apparatus according to claim 1, wherein:
the safety device includes at least one mechanical switch; and
the at least one mechanical switch is configured to be assigned a function via the tablet.

9. The teach apparatus according to claim 1, wherein the tablet is configured for bidirectional information exchange with a computer, serving as a development environment for development of the teach apparatus.

10. The teach apparatus according to claim 1, wherein the safety device is configured to be supplied with electricity from the robot via the cable.

* * * * *